United States Patent [19]
Hasegawa et al.

[11] Patent Number: 4,811,606
[45] Date of Patent: Mar. 14, 1989

[54] MASS FLOWMETER

[75] Inventors: Hiroaki Hasegawa, Kawasaki; Yasuji Miyata, Yokohama; Koyata Sugimoto, Tokyo; Akira Nakamura, Hiratsuka, all of Japan

[73] Assignee: Tokico, Ltd., Kanagawa, Japan

[21] Appl. No.: 183,606

[22] Filed: Apr. 19, 1988

[30] Foreign Application Priority Data

Apr. 20, 1987 [JP] Japan .................................. 62-97183
Aug. 20, 1987 [JP] Japan ................................ 62-206985

[51] Int. Cl.⁴ .............................................. G01F 1/84
[52] U.S. Cl. ................................................. 73/861.38
[58] Field of Search ......................... 73/861.37, 861.38

[56] References Cited
U.S. PATENT DOCUMENTS

| | | |
|---|---|---|
| 3,132,512 | 5/1964 | Roth . |
| 3,485,098 | 12/1969 | Sipin . |
| 4,127,028 | 11/1978 | Cox et al. . |
| 4,187,721 | 7/1978 | Smith . |
| 4,192,184 | 3/1980 | Cox et al. . |
| 4,311,054 | 1/1982 | Cox et al. . |
| 4,622,858 | 11/1986 | Mizerak .......................... 73/861.38 |
| 4,730,501 | 3/1988 | Levien ............................ 73/861.38 |

Primary Examiner—Herbert Goldstein
Attorney, Agent, or Firm—Michael N. Meller

[57] ABSTRACT

A mass flowmeter for measuring a mass flow rate of a fluid passing through a pair of straight tubes in mutually opposing directions by measuring the Coriolis force working on the fluid when the straight tubes are swung to and from each other. The tubes are swung by a vibrator at one end of the tubes and the other end of the tubes is fixed so that the ends of the tubes alternately approach and depart to and from each other. The both ends of the tubes subjected to vibration are connected by a flexible tube.

8 Claims, 8 Drawing Sheets

MASS FLOWMETER

BACKGROUND OF THE INVENTION

The present invention generally relates to mass flowmeters and in particular to a mass flowmeter having an arrangement for directly measuring a mass flow rate of a fluid.

In measurement of the flow rate of a fluid, it is desirable that the measured flow rate is represented in terms of mass so that the measured flow rate is not influenced by the type of the fluid, its physical property such as density, viscosity and the like, nor the condition of the fluid such as the temperature and pressure.

Conventionally, two types of mass flowmeters are used in measurement of the mass flow rate of the fluid. One of which is called indirect type which measures the volumetric flow rate of the fluid and converts the measured volumetric flow rate to the mass flow rate. Another type of the mass flowmeter is called a direct type which directly measures the mass flow rate of the fluid. Generally, the direct type mass flowmeter has a higher precision as compared with the indirect type mass flowmeter.

Various types of mass flowmeters are proposed on the basis of various principles for measurement of the flow rate in order to achieve higher precision. One of such flowmeter utilizes the Coriolis force which works on the fluid flowing through a vibrating tube for the direct measurement of the mass flow rate of the fluid.

For example, a mass flowmeter comprising a pair of U-shaped tubes connected to a flowmeter body having a fluid inlet and a fluid outlet is known. In this flowmeter, the pair of U-shaped tubes are vibrated or swung to a direction so as to alternatively increase and decrease the mutual distance therebetween. As a result of the vibration, the Coriolis force proportional to the mass flow rate of the fluid is applied to the fluid and the tubes are displaced. By detecting this displacement, the mass flow rate of the fluid is obtained.

In the aforementioned mass flowmeter utilizing the Coriolis force, it is difficult to manufacture the pair of tubes to a strictly identical size and shape. As a result, there tends to be a variation in the natural frequency of the respective U-shaped tubes. Therefore, it becomes necessary to compensate the variation of the vibratory characteristic of the tubes to coincide the natural frequency of the both of the tubes in order to improve the precision of the flow rate measurement. This compensation of the vibratory characteristic of the tubes is made by adjusting the balance weight on the tubes. However, the mounting and adjustment of the balance weight is a complex and tedious procedure.

In this type of mass flowmeter aforementioned, there arises another problem in that the U-shaped tubes extend transversally to the direction of a conduit on which is mounted the flowmeter. As a result, the U-shaped tubes occupy a large space which is substantially larger than the space for the conduit. Thus, such a mass flowmeter requires a large mounting space. Such a conventional mass flowmeter further requires a large flowmeter housing for accommodating the flowmeter unit and the U-shaped tubes. Therefore, the flowmeter cannot be positioned easily on a portion of a facility where other apparatus and devices are densely mounted. Instead, one has to painstakingly search for a suitable space surrounded by other apparatus and devices for accommodating the flowmeter housing.

SUMMARY OF THE INVENTION

Accordingly, it is a general object of the present invention to provide a novel and useful mass flowmeter wherein the problems aforementioned are eliminated.

Another and more specific object of the present invention is to provide a mass flowmeter for measuring the mass flow rate of a fluid by measuring the Coriolis force working on the fluid passing through a vibrating tube wherein readings are obtained stably without influence of the variation in the size and shape of the tube.

Another object of the present invention is to provide a mass flowmeter for measuring the mass flow rate of a fluid by measuring the Coriolis force working on the fluid comprising a first straight tube portion having an end connected to an inlet into which the fluid to be measured enters, a second straight tube portion extending parallel to the first straight tube portion and having an end connected to an outlet from which the fluid exits, an intermediate tube having an end connected to another end of said first straight tube portion and having another end connected to another end of said second straight tube portion for conducting the fluid from the first straight tube portion to the second straight tube portion, a vibrating means for deflecting the first and second straight tube portions in such a manner that a distance between the first and second straight tube portions alternately increases and decreases, and sensing means for detecting displacement of said first and second straight tube portions responsive to the vibration applied to the first and second straight tube portions, wherein the mass flow rate is measured with high precision on the basis of the Coriolis force working on the fluid passing through the first and second straight tube portions. According to the present invention, the magnitude of the Coriolis force working on the fluid is measured at the straight tube portion which has a straight tubular shape and therefore can be manufactured with high precision. Thus, the mass flow rate of the fluid passing through the tubes can be measured without influence of the variation in the size and shape of the tubes forming the straight tube portion. Further, the mass flowmeter according to the present invention allows the mounting of the vibrator on the pair of first and second straight tube portions which extend parallel to each other. Thereby, the support for the vibrator can be eliminated.

Another object of the present invention is to provide a mass flowmeter for measuring a mass flow rate of a fluid by measuring the Coriolis force working on the fluid passing through a first and second straight tube portions which extend in a substantially perpendicular direction to a conduit on which the mass flowmeter is mounted, wherein the first and second straight tube portions are vibrated in a direction parallel to the direction of the conduit. As a result, the sensing means becomes less sensitive to the undesirable external transversal vibration of the conduit and the error in the measurement can be minimized.

Another object of the present invention is to provide a mass flowmeter for measuring a mass flow rate of a fluid by measuring the Coriolis force working on the fluid passing through a first and second straight tube portions which extend substantially parallel to the direction of a conduit on which the mass flowmeter is mounted. According to the present invention the projection of the first and second straight tube portions perpendicularly to the direction of the conduit is minimized and the size of the flowmeter can be reduced. Thus a compact mass flowmeter can be obtained.

Still another object of the present invention is to provide a mass flowmeter for measuring a mass flow rate of a fluid by measuring the Coriolis force working on the fluid passing through a first and second straight tube portions wherein an intermediate tube portion connecting the first and second straight tube portions is made flexible. According to the present invention, the stiffness of the intermediate tube portion resisting the swinging motion of the first and second straight tube portions is reduced and the displacement of the first and second tube portions due to the Coriolis force corresponding to the mass flow rate is increased. As a result, the flow rate is measured more precisely. Further, one may use a relatively small vibrator as the intermediate tube portion is easily deformed and the force to be applied by the vibrator can be reduced.

Yet another object of the present invention is to provide a mass flowmeter for measuring a mass flow rate of a fluid by measuring the Coriolis force working on the fluid passing through a first and second straight tube portions wherein the deviation of the natural frequency of the first and second tubes due to the difference of the size, shape and mass of these tubes can be easily corrected during the manufacturing step.

Other objects and further features of the present invention will be apparent from the following description for the preferred embodiments when read in conjunction with the attached drawings.

DETAILED DESCRIPTION

Figure 1:
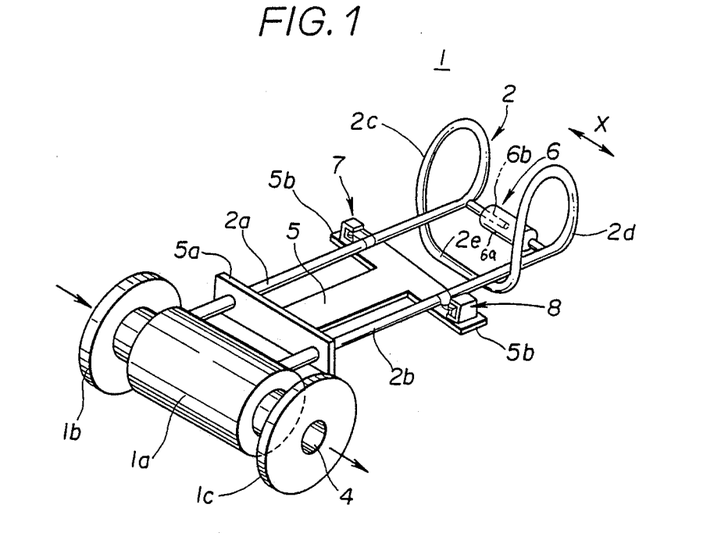
FIG. 1 is a perspective view showing a first embodiment of the mass flowmeter according to the present invention.
Figure 2:
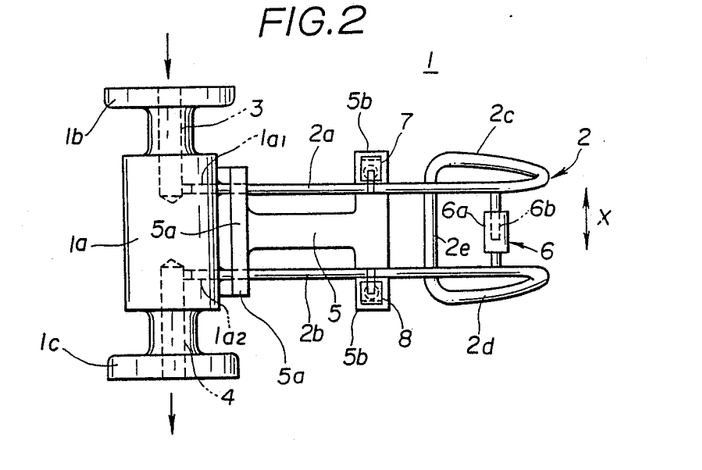
FIGS. 2 and 3 are respectively a plan view and a side view showing the mass flowmeter of FIG. 1.
Figure 3:
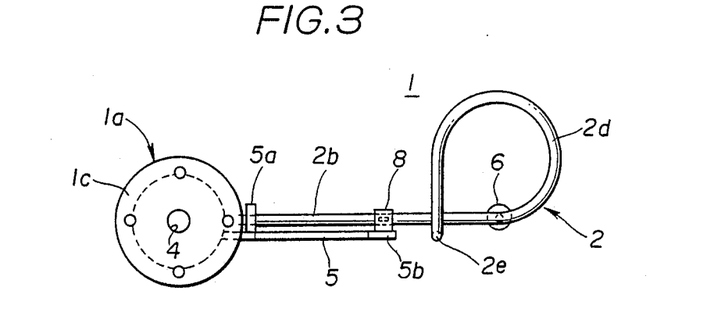

FIGS. 1 through 3 show a first embodiment of the mass flowmeter according to the present invention. In the drawing, a body $1a$ of the flowmeter 1 is provided with a detecting tube 2 made from a metallic tube. As shown in FIG. 2, the flowmeter body $1a$ comprises an upstream side flange $1b$ and a downstream side flange $1c$ respectively connected to an upstream side conduit (not shown) and a downstream side conduit (not shown). Further, the flowmeter body $1a$ comprises an inlet 3 communicating with the upstream side conduit and into which a fluid to be measured enters and an outlet 4 communicating with the downstream side conduit.

As illustrated in FIGS. 1 through 3, the detecting tube comprises an inlet side straight tube portion $2a$ and an outlet side straight tube portion $2b$ which are disposed in a generally perpendicular direction to the direction of the conduit and are parallel to each other, bent portions $2c$ and $2d$ forming looped passages at the ends of the straight tube portions $2a$ and $2b$, and a connecting portion $2e$ connecting the bent portions $2c$ and $2d$.

A first end of the inlet side straight tube portion $2a$ is fitted into a mounting hole $1a_1$ on the body $1a$ and welded to the body. Thus, the straight tube portion $2a$ communicates with the inlet 3. Further, a first end of the outlet side straight tube portion $2b$ is fitted into a mounting hole $1a_2$ on the body $1a$ and welded to the body. Thus, the straight tube portion $2b$ communicates with the outlet 4. The aforementioned first ends of the respective straight tube portions $2a$ and $2b$ penetrate through a bracket $5a$ formed vertically at an end of a supporting member 5 fixed on the body $1a$, and the straight tube portions $2a$ and $2b$ are are fixed on the bracket $5a$ at a predetermined distance from each other. The bent portions $2c$ and $2d$ are bent to form loops respectively passing outside of the straight tube portions $2a$ and $2b$ and connected to the connecting portion $2e$ below the straight tube portions $2a$ and $2b$.

It can be seen that second ends of the two straight tube portions $2a$ and $2b$ of the detecting tube 2 located at the other ends of the straight tube portions $2a$ and $2b$ are connected together by the looped bent portions $2c$ and $2d$, and therefore these second ends of the straight tube portions $2a$ and $2b$ can be swung or deflected to and from each other freely as indicated by an arrow X, even though the first ends of the straight tube portions $2a$ and $2b$ are fixed.

At tip end portions corresponding to the second end of the straight tube portions $2a$ and $2b$ extending parallel to each other is mounted a vibrator 6 of an electromagnetic solenoid type. In the example illustrated, the vibrator 6 is mounted so that a winding part $6a$ is fixed to the straight tube portion $2b$ corresponding to the outlet side and a magnet part $6b$ is fixed to the straight tube portion $2a$ corresponding to the inlet side. The vibrator therefore applies vibration to the straight tube portions $2a$ and $2b$ as indicated by the arrow X when it is driven by a current flowing through the winding $6a$.

The displacement due to the swinging motion of the straight tube portions $2a$ and $2b$ responsive to the application of vibration by the vibrator 6 is detected by pickup devices 7 and 8. As the pickup device 8 has an identical construction to the pickup device 7, only one of the pickup devices will be described with reference to FIGS. 4 and 5.

Figure 4:
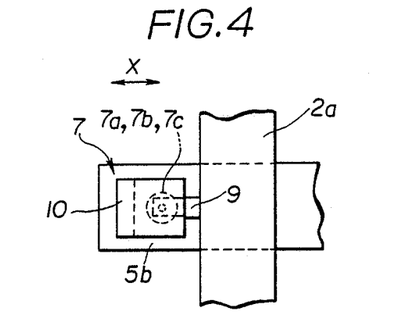
FIGS. 4 and 5 are respectively a plan view and a side view showing a pick up device used in the mass flowmeter of FIG. 1.
Figure 5:
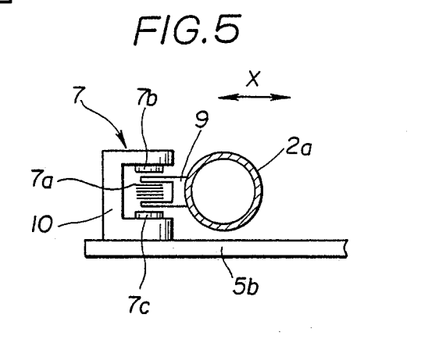

Referring to FIGS. 4 and 5, the pickup device 7 comprises a coil portion 7a carried by a holder 9 projecting laterally from the straight tube portion 2a at an intermediate position along the longitudinal direction of the straight tube portion 2a, and a pair of magnets 7b and 7c carried on a U-shaped bracket 10 so as to face to the coil portion 7a from an upper direction and from a lower direction. Further, the bracket 10 is carried by a holding part 5b formed at an end of the supporting member 5 along the direction indicated by the arrow X. As the detecting tube 2 is vibrated by the vibrator 6, the coil portion 7a located between the magnets 7b and 7c is displaced in the direction as indicated by the arrow X. Thereby, a voltage is induced in the coil portion 7a responsive to tee displacement of the straight tube portion 2a. The pickup device thus detects the displacement of the straight tube portion 2a and produces a voltage indicating the displacement.

The straight tube portions 2a and 2b extending linearly are made from a metallic tube manufactured with a highly uniform size and shape. Thus, although the detecting tube 2 comprises bent portions 2c and 2d and the connecting portion 2e which are not straight, a uniform size and shape is guaranteed for the portion corresponding to the straight tube portions 2a and 2b. According to the design, the pickup devices 7 and 8 are disposed in a position so as to detect the displacement of the straight tube portions 2a and 2b having an identical size and shape to each other. Thus, the detecting operation of the devices 7 and 8 is less influenced by the variation of the size and shape of the tubes as compared to the conventional flowmeter which detects the displacement of the tube made from a bent metallic tube.

Next, an operation of the mass flowmeter designed as above will be described with reference to FIGS. 6 and 7.

When measuring the flow rate, the fluid to be measured is introduced into the flowmeter through the inlet 3 and conducted to the straight tube portion 2c of the detecting tube 2. Further, the fluid is passed from the straight tube portion 2a to the bent portion 2c and reaches the connecting portion 2e. From the connecting portion 2e, the fluid passes through the bent portion 2d and the straight tube portion 2b and returns to the body 1a. Thereafter, the fluid exits from the outlet 4. At the same time as the passage of the fluid, the detecting tube 2 is vibrated by the vibrator 6. As a result, the straight tube portions 2a and 2b swing with a natural frequency determined by the kinetic constants of the detecting tube and the mass flow rate of the fluid flowing through the detecting tube 2.

It should be noted that the detecting tube 2 is vibrated in a state that the fluid to be measured is flowing through. Thus, the natural frequency is determined responsive to the flow rate of the fluid at that time. Further, it should be noted that the straight tube portions 2a and 2b alternately deflect elastically to and from each other, so that at one instance they deflect to separate from each other and at the next instance they deflect to approach to each other.

As the first end of the straight tube portions 2a and 2b are fixed against movement by the bracket 5a acting as a fulcrum, the straight tube portions 2a and 2b are deflected about the penetrating portion of the bracket 5a in such a manner that the displacement to the direction X becomes continuously larger toward the tip end of the tube portions 2a and 2b. In other words, the straight tube portions 2a and 2b experience an angular movement with an angular velocity of $\omega$ as a result of the vibration. Further, as the bent portions 2c and 2d are bent to form a loop which is flexible, the bent portions 2c and 2d easily deform responsive to the vibration of the vibrator applying a vibration as indicated by X. Thus the displacement of the straight tube portions 2a and 2b to and from each other is not hindered.

As described heretofore, the amplitude of the vibration of the straight tube portion 2a at the inlet side becomes increasingly larger toward its tip end. Thus, when a fluid is introduced into the tube portion 2a, the fluid also moves toward the direction X with increasing velocity as it flows to the tip end of the straight tube portion 2a. In other words, the fluid in the tube is subjected to an acceleration in the direction of the swinging motion as indicated by the arrow X. Conversely, in the case of the straight tube portion 2b at the outlet side, the velocity of the swinging motion of the tube portion 2b becomes increasingly small toward the first end connected to the body 1a. Thus, the movement of the fluid to the direction X decreased as it returns to the flowmeter body 1a. Thereby, the fluid experiences an acceleration opposing to the direction of the vibration. Such an acceleration applied to the fluid due to the vibration of the detecting tube 2 induces the Coriolis force Fc working against the direction of the acceleration.

Figure 6:
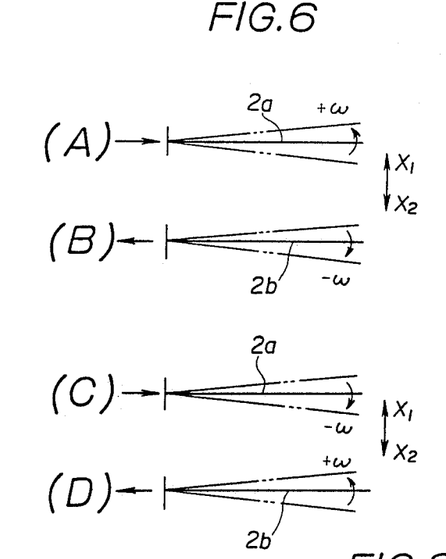
FIG. 6 is a plan view showing a direction in which a straight tube portion is deflected when measuring the flow rate.
Figure 7:
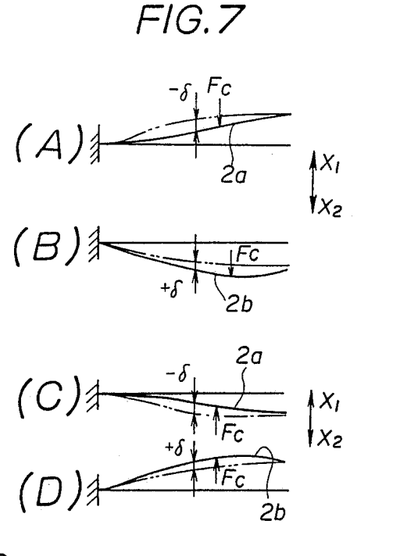
FIG. 7 is a plan view showing a displacement of the straight tube portion due to the Coriolis force working on a fluid passing through the straight tube portion during operation of the flowmeter.

Referring to FIGS. 6(A) and (B), in a case that one of the straight tube portions, 2a, is displaced to the direction indicated by an arrow X1 with an angular velocity of $+\omega$ and the other of the straight tube portions, 2b, is displaced to the direction indicated by an arrow X2 with an angular velocity of $-\omega$. In one cycle in which the straight tube portions 2a and 2b separate from each other, the Coriolis force Fc is induced at these tube portions 2a and 2b in a direction indicated by an arrow X2 in FIGS. 7(A) and (B). As a result of this extra force applied to the tube portions 2a and 2b, the straight tube portions 2a and 2b displace respectively by an amount of $-\delta$ and $+\delta$ as indicated by a solid line relative to the positions indicated by one dotted line indicating the positions to be assumed by the straight tube portions 2a and 2b when no Coriolis force was applied.

Next, a case will be considered in which one of the straight tube portions, 2a, is displaced in the direction indicated by the arrow X2 with an angular velocity of $-\omega$ and the other straight tube portion 2b is displaced in the direction indicated by the arrow X1 with an angular velocity of $\omega$ as shown in FIGS. 6(C) and (D). In such a cycle in which the straight tube portions 2a and 2b are moved so that the distance therebetween is reduced, the Coriolis force Fc works on the straight tube portions 2a and 2b in the direction indicated by the arrow X1 as shown in FIGS. 7(C) and (D). Thus, the straight tube portions 2a and 2b are displaced as indicated by solid lines which are offset by $-\delta$ and $+\delta$ respectively from the one dotted lines indicating the displacement without the Coriolis force.

The magnitude of the Coriolis force can be obtained by detecting the displacement $-\delta$ or $+\delta$ of the straight tube portions 2a and 2b or the difference in the phase angle between the straight tube portions 2a and 2a by means of the pickup devices 7 and 8. As the magnitude of the Coriolis force Fc is represented by 2 $\omega$mv where m is the mass of the fluid and v is the velocity, the mass flow rate (mv) can be obtained directly by measuring the angular velocity $\omega$ and the Coriolis force Fc.

The pickup devices 7 and 8 detect the displacement $-\delta$ and $+\delta$ in terms of a signal indicating a time interval. In other words, a time interval required for a voltage induced in the coil portion of the pickup devices 7 and 8 to change from a reference voltage to a predetermined voltage different from the reference voltage is measured. This time interval is proportional to the mass flow rate.

Thus, the signals detected by the pickup devices 7 and 8 are converted to a voltage signal proportional to the mass flow rate by a time integration after the detected signal from the pickup device is conditioned and suitably amplified. Further, the voltage signal thus obtained is converted to a suitable voltage pulse signal or analog signal. The processing of the signals from the pickup devices 7 and 8 is well known to the person skilled in the art and therefore further description with reference to the drawings will be omitted.

It should be noted that the mass flowmeter 1 designed as described heretofore measures the mass flow rate by detection of the displacement of the two straight tube portions 2a and 2b which can be easily formed to have an identical size and shape. Thus, the measured flow rate is less affected by the dimensional tolerance of the detecting tube 2 and therefore is more accurate as compared with the conventional mass flowmeter. Further, the natural frequency of the detecting tube having such straight tube portions can easily be adjusted by means of the balancing weight. Although the connecting portion 2e of the detecting tube is shown to cross the straight tube portions 2a and 2b below these tube portions in the example illustrated, the detecting tube 2 is not limited to such a construction. For example, the connecting portion 2e may cross the straight tube portions 2a and 2b at a position above these tube portions.

Further, it should be noted that, as compared with the conventional mass flowmeter in which a single U-shaped tube is swung horizontally in a direction perpendicular to the direction of the conduit where the vibrator must be supported on a supporting member, the vibrator 6 of the present mass flowmeter 1 vibrating the pair of the straight tube portions 2a and 2b to and from each other can be supported between the two tube portions 2a and 2b which form part of the single detecting tube 2. Thus the additional supporting member for the vibrator is not necessary in the case of the mass flowmeter of the present embodiment. In the conventional flowmeter, one has to use a pair of U-shaped tubes in order to support the vibrators if one wishes to eliminate the additional supporting member.

Generally, a conduit tends to experience various vibrations transverse to the direction of the conduit, while the vibration longitudinal to the direction of the conduit is usually small. As a result, there is a tendency that an error in the measurement appears when the detecting tube 2 is vibrated perpendicularly to the direction of the conduit, due to the alternation of the vibrational characteristic of the detecting tube by the vibration of the conduit. In the mass flowmeter of the present embodiment, the pair of the straight tube portions 2a and 2b are vibrated to and from each other in a direction parallel to the direction of the conduit. Thus, the measurement is less sensitive to the vibration of the conduit and an accurate measurement of the mass flow rate is obtained for the fluid passing through the detecting tube 2.

Figure 8:
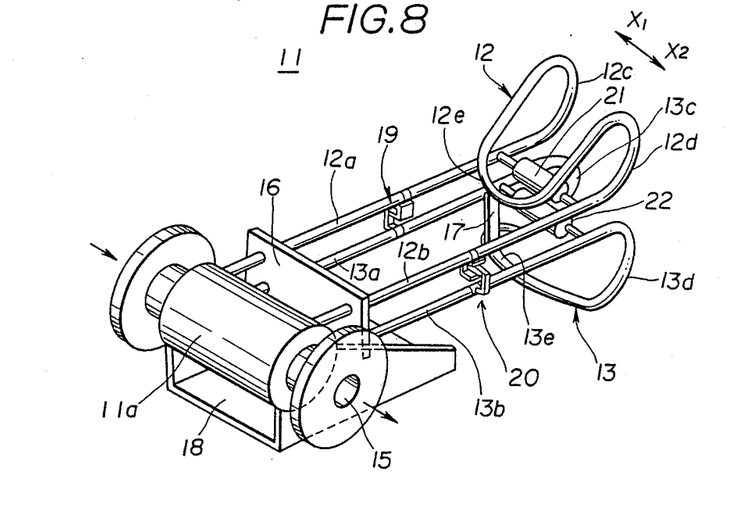
FIGS. 8, 9 and 10 are a perspective view, plan view and a side view respectively showing a second embodiment of the mass flowmeter of the present invention.
Figure 9:
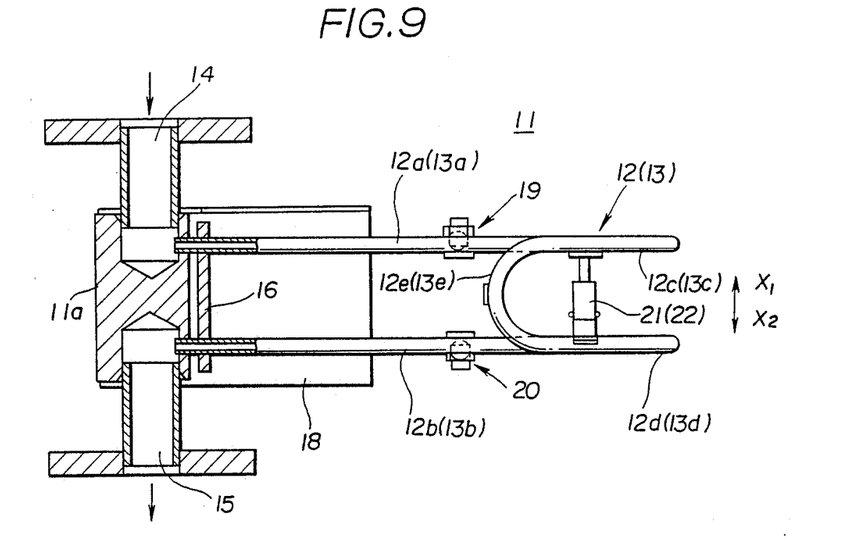
Figure 10:
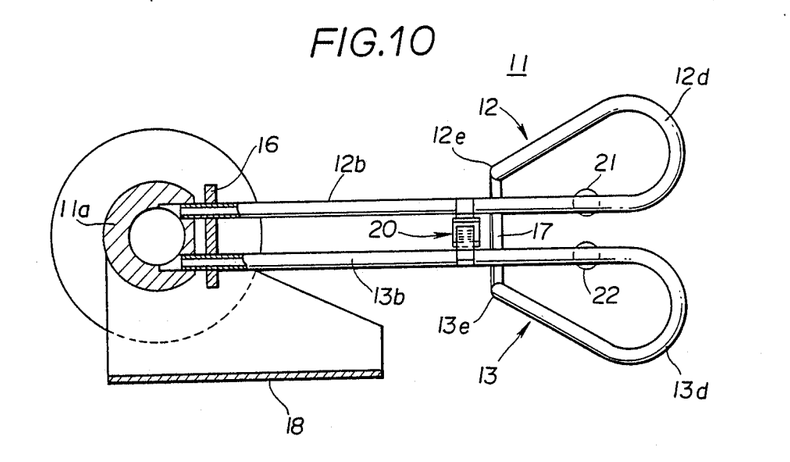

FIGS. 8 through 10 show a second embodiment of the mass flowmeter according to the present invention. Referring to the drawing, a mass flowmeter 11 comprises a flowmeter body 11a on which are connected a pair of detecting tubes 12 and 13. It can be seen that one detecting tube 12 comprises a straight tube portion 12a communicating with an inlet 14, a straight tube portion 12b communicating with an outlet 15, bent portions 12c and 12d at respective ends of the straight tube portions 12a and 12b and bent to form a loop, and a U-shaped connecting portion 12e connecting the two bent portions 12c and 12d.

Another detecting tube 13 also has a similar construction in that it comprises a pair of straight tube portions 13a and 13b extending parallel with the straight tube portions 12a and 12b bent portions 13c and 13d connected to the straight tube portions 13a and 13b, and a U-shaped connecting portion 13e connecting the two bent portions 13c and 13d. The detecting tube 13 is disposed symmetrically below the detecting tube 12 so that the bent portions 12c and 12d and the connecting portion 12e for the detecting tube 12 and the bent portions 13c and 13d and the connecting portion 13e for the detecting tube 13 are directly opposite from each other. One end of the straight tube portions 12a, 12b, 13a and 13b penetrate through a fulcrum plate 16 at predetermined positions and are connected to the flowmeter body 11a. Further, the connecting portions 12e and 13e of the detecting tubes 12 and 13 are fixed at a predetermined distance by means of a supporting member 17 connecting these two portions. The flowmeter body 11a is supported by a supporting base 18 located below the flowmeter body 11a for bearing the load of the two elongating detecting tubes 12 and 13.

Referring to FIG. 8, it can be seen that a pickup device 19 is disposed between the two straight tube portions 12a and 13a into which the fluid is introduced and a pickup device 20 is disposed between the two straight tube portions 12b and 13b from which the fluid is exhausted. The pickup devices 19 and 20 themselves have an identical construction with the pickup devices 7 and 8 for the first embodiment except for the fact that the coil portion is mounted on the straight tube portions 13a and 13b located below the straight tube portions 12a and 12b and that the magnets facing the coil from above and below are mounted on the straight tube portions 12a and 12b located above the straight tube portions 13a and 13b. According to such a construction, the supporting member for supporting the pickup devices 19 and 20 can be eliminated. Further, vibrators 21 and 22 having an identical construction to the vibrator 6 of the first embodiment are provided at the ends of the straight tube portions 12a and 12b remote from the flowmeter body 1a in such a manner that the vibrator 21 connects with the straight tube portions 12a and 12b and the vibrator 22 connects with the straight tube portions 13a and 13b.

When measuring the flow rate, the fluid is introduced to the detecting tubes 12 and 13 and the detecting tubes are vibrated at the same time. The fluid introduced from the inlet 14 is branched to enter the straight tube portions 12a and 13a of the detecting tube 12 and 13, and the fluid thus introduced then reaches the straight tube portions 12b and 13b respectively through the bent portion 12c, connecting portion 12e and the bent portion 12d, and through the bent portion 13c, connecting portion 13e and the bent portion 13d. The fluid then exits from the detecting tube through the outlet 15. The detecting tubes 12 and 13 are vibrated by the vibrators 21 and 22, and thereby the detecting tubes 12 and 13 vibrate with a natural frequency determined by the kinetic constant of the detecting tubes and the flow rate of the fluid passing through the detecting tubes.

As the fluid passes through the vibrating detecting tubes 12 and 13, the Coriolis force is induced and the straight tube portions 12a, 12b, 13a and 13b are displaced by the Coriolis force. In operation of the flowmeter 11, the detecting tubes 12 and 13 are vibrated with respective phases which differ from each other by 180 degrees. Thus, when the two straight tube portions 12a and 12b in the upper detecting tube move away from each other, the two straight tube portions 13a and 13b in the lower detecting tube approach to each other. In other words, when the detecting tube 12 deflects as shown in FIGS. 6(A) and (B), the detecting tube 13 deflects as shown in FIGS. 6(C) and (D). As a result, the fluid portions passing through the straight tube portions 12a and 12b respectively experience the Coriolis force as indicated in FIGS. 7(A) and (B), and the fluid portions passing through the straight tube portions 13a and 13b respectively experience the Coriolis force as indicated in FIGS. 7(C) and (D).

The pickup devices 19 and 20 detect the mutual displacement of the detecting tubes 12 and 13 which vibrate as described previously. On the basis of the output signal from the pickup devices, the mass flow rate of the fluid flowing through the detecting tubes is obtained. In the case of the mass flowmeter according to the present embodiment, the mutual displacement of the straight tube portions 12a and 13a, and the mutual displacement of the straight tube portions 1b and 13b, are twice as large as the displacement in the case of the first embodiment. Thus, the mass flowmeter designed in accordance with the present embodiment measures the mass flow rate with a even higher precision than the mass flowmeter of the first embodiment. For the same reason as described above, the effect of the noise due to the external undesirable vibration of the conduit on the detection of the displacement of the detecting tubes 12 and 13 is cancelled and the measurement of the mass flow rate can be conducted stably without disturbance by the external vibrations.

In order to improve the precision of the measurement, it is desirable to make the pair of the detecting tubes 12 and 13 as identical in size and shape as is possible. However, such a requirement is usually not satisfied due to the tolerance in manufacture of these detecting tubes. Thus, a balancing weight and the like is mounted on the detecting tubes 12 and 13 which is adjusted so that the natural frequencies of the both detecting tubes coincide with each other. In the mass flowmeter of the present embodiment, the straight tube portions 12a, 12b, 13a and 13b which form the major portion of the detecting tubes 12 and 13 are formed to have a straight shape. Accordingly, the adjustment of the balancing weight is easily achieved during the manufacturing process of the detecting tube. This is particularly easy as a result of the symmetry of the detecting tubes 12 and 13 as well as the weight which is identical in the both detecting tubes.

In the mass flowmeter 11, the Coriolis force is detected at the straight tube portions 12a and 12b which are made uniform and have virtually no variation in the size and shape. Thus, the mass flowmeter can provide a reading of the mass flow rate which is less affected by the manufacturing tolerance.

The pickup devices 7, 8, 19 and 20 are not limited to those electromagnetic type pickup devices described but optical sensors comprising a photo coupler may be used as well.

Figures 11, 12:
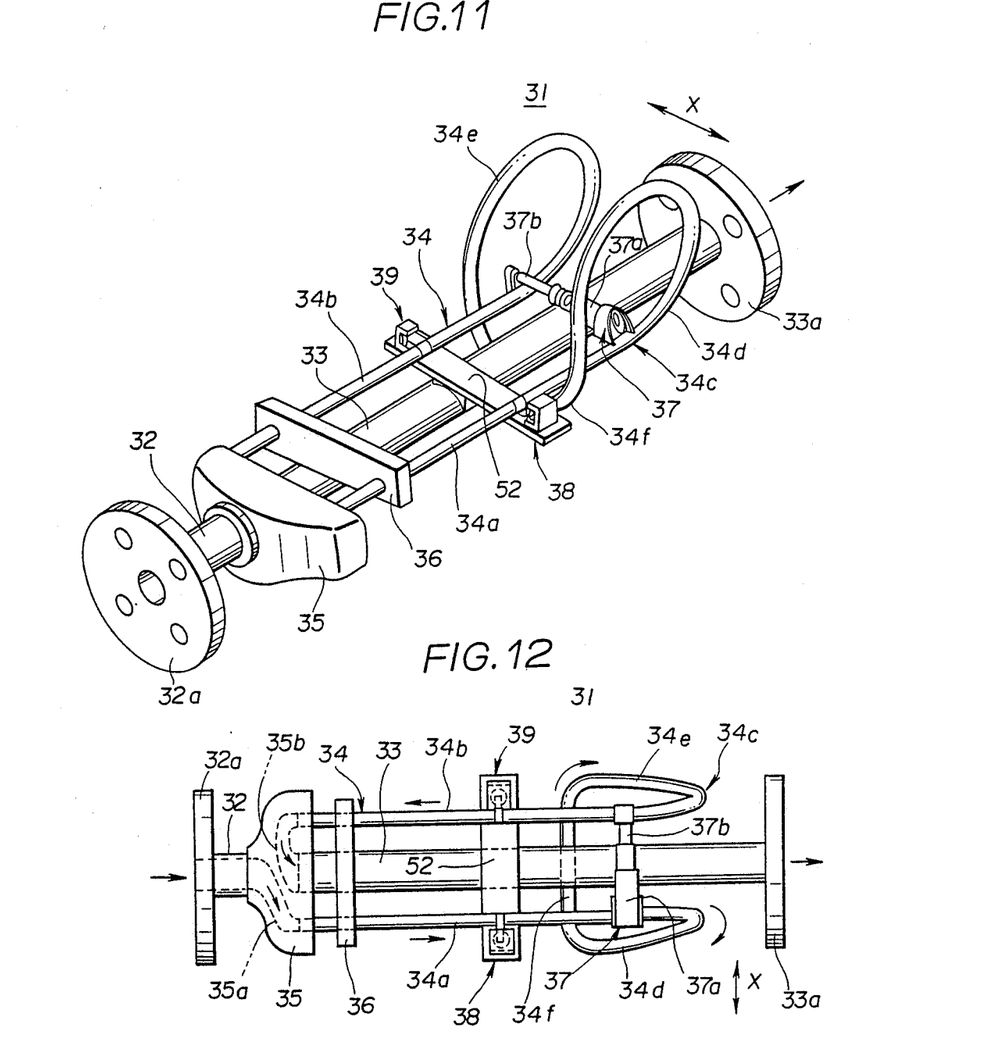
FIGS. 11, 12 and 13 are perspective view, plan view and a side view respectively showing a third embodiment of the mass flowmeter of the present invention.
Figure 13:
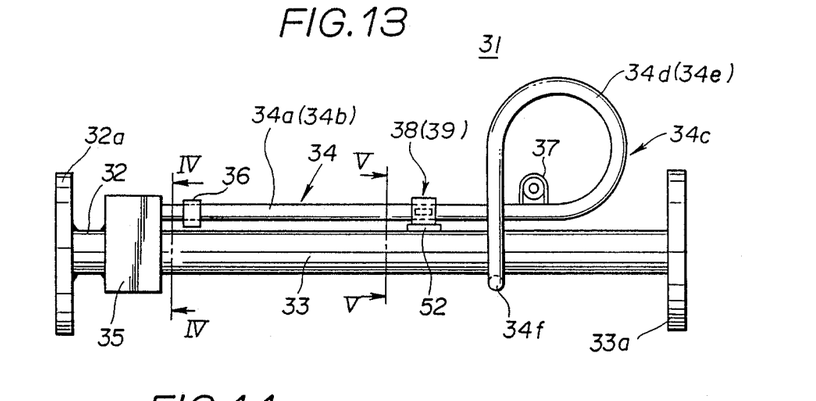

FIGS. 11 through 13 show a third embodiment of a mass flowmeter according to the present invention.

In the drawing, a mass flowmeter 31 comprises a manifold 35 interposed between an inlet tube 32 located in an upstream side and an outlet tube 33 located in a downstream side. The inlet tube 32 is formed with a flange 32a at an end remote from the manifold 35 for connection with the conduit in the upstream side (not shown). The inlet tube 32 further communicates with a fluid path 35a in the manifold 35 which is indicated in FIG. 12 by a broken line.

The outlet tube has a flange 33a at an end remote from the manifold 35 for connection with the conduit in the downstream side (not shown). The outlet tube further communicates with a fluid path 35b in the manifold 35 which is also indicated in FIG. 12 by the broken line.

A detecting tube 34 connected to the manifold 35 for communication with the fluid paths 35a and 35b comprises a first straight tube portion 34a extending along the outlet tube 33, a second straight tube portion 34b disposed parallel to the first straight tube portion 34a, and a connecting portion 34c for connecting the first and second straight tube portions 34a and 34b. As illustrated in FIG. 12, the first straight tube portion 34a communicates with the fluid path 35a in the manifold 35 and the second straight tube portion 34b communicates with the fluid path 35b in the manifold 35.

The fluid from the conduit of the upstream side is introduced to the first straight tube portion 34a through the inlet tube 32 and the fluid path 35a, and conducted to the second straight tube portion 34b through the connecting portion 34c. The fluid passed through the straight tube portion 34b then passes through the fluid path 35b of the manifold 35 and the outlet tube 33 and is exhausted to the conduit in the downstream side.

Figure 14:
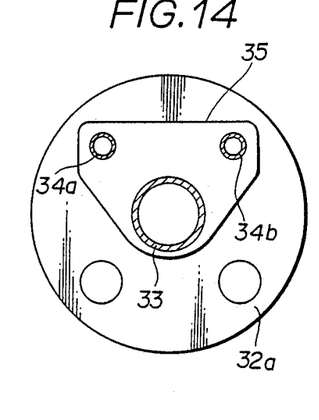
FIG. 14 is a cross sectional view taken along a line IV—IV of FIG. 13.

As illustrated in FIG. 14, the mutually parallel straight tube portions 34a and 34b are located above the outlet tube 33 and are fixed to the manifold 35 so that they extend parallel to the outlet tube 33 on either sides of the outlet tube 33.

Accordingly, the detecting tube 34 for the mass flowmeter 31 does not project extensively beyond the space for the conduit. In other words, the overall size of the mass flowmeter of the present embodiment is made compact. Thus, the mass flowmeter 31 can be mounted anywhere on the conduit provided that there is a space available for the conduit.

The straight tube portions 34a and 34b are passed through the holes formed in a supporting plate 36 and are fixed thereto by welding. Thus, the straight tube portions 34a and 34b are swung around the portion which is fixed to the supporting plate 36 which works as a fulcrum, when a vibration is applied to the detecting tube 34. Further, it should be noted that the detecting tube 34 of the mass flowmeter 31 extends close to the outlet tube. Therefore, the effect of external vibration transmitted through the conduit and applied to the detecting tube is not as serious as to the case when the detecting tube extends from a position remote from the outlet tube.

It should be noted that the connecting portion 34c of the detecting tube 34 comprises bent portions 34d and 34e forming a loop at respective ends of the straight tube portions 34a and 34b, and an intermediate portion 34f crossing the outlet tube 33 at a position below the outlet tube 33 and connected to the bent portions 34d and 34e at a position on the outer side of the straight tube portions 34a and 34b. Thus, the ends of the straight tube portions 34a and 34b remote from the manifold 35 can deflect to and from each other as indicated by an arrow X, although the portion of the straight tube portions 34a and 34b close to the manifold 35 is prevented from movement by the supporting plate 36.

Figure 15:
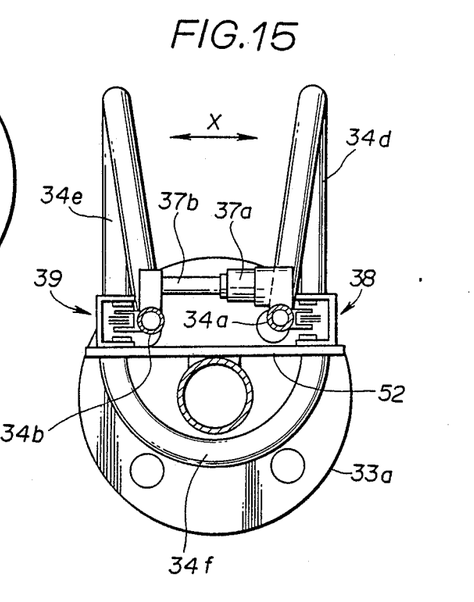
FIG. 15 is a cross sectional view taken along a line V—V of FIG. 13.

A vibrator 37 similar to the vibrator 6 in the first embodiment is connected between the straight tube portions 34a and 34b extending in parallel and is close to the ends remote from the manifold 35. As shown in FIG. 15, the vibrator 37 comprises a winding part 37a mounted on the straight tube portion 34a of the inlet side and a magnet part 37b mounted on the straight tube portion 34b of the outlet side so as to engage with the winding part 37a. As the winding part 37a is excited by the electric current, the vibrator applies vibration to the straight tube portions 34a and 34b to move them as indicated by the arrow X.

Further, pickup devices 38 and 39 are provided on the detecting tube 34 for detection of the deflection of the straight tube portions 34a and 34b extending in the direction of the conduit in response to the vibration by the vibrator 37. The pickup devices 38 and 39 themselves have an identical construction to the pickup devices shown in FIGS. 4 and 5. Therefore, further description of the pickup devices will be omitted.

In the example illustrated, the straight tube portions 34a and 34b are made from a metallic tube which is made to have a highly uniform size and shape. As a result, the straight tube portions 34a and 34d forming the detecting tube have an identical size and shape, even though they have bent portions 34d, 34e and the intermediate portion 34f connected at the end. In other words, the pickup devices 38 and 39 are disposed at a position for detection of the displacement of the straight tube portions 34a and 34b having an identical size and shape. Thus, the detection of the displacement of the detecting tube can be performed with a higher precision as compared with the case of the mass flowmeter using a U-shaped metallic tube, and one can achieve a measurement which is less affected by the variation of the size and shape of the metallic tube caused by the bending of the tube.

The operation of the mass flowmeter 31 designed as described is identical to the one for the mass flowmeter 1 of the first embodiment except for the orientation of the straight tube portions 34a and 34b relative to the outlet tube 33, and the description thereof will be omitted.

Next, a fourth embodiment of the mass flowmeter of the present invention will be described with reference to FIGS. 16 through 18. In the drawing, a mass flowmeter 41 comprises a manifold 44 on which are mounted a pair of detecting tubes 42 and 43. As illustrated in FIG. 11, the manifold 44 is interposed between an inlet tube 45 and an outlet tube 46. Further, a fluid path 44a and a fluid path 44b are formed in the manifold 44 which respectively communicate with the inlet tube 45 and the outlet tube 46. As shown in FIG. 18, the fluid path 44a is branched in the manifold 44 to communicate with connecting ports $44a_1$ and $44a_2$ which are aligned vertically in the manifold 44. Similarly, the fluid path 44b is branched and communicates with connecting ports $44b_1$ and $44b_2$.

The detecting tube 42 located above the detecting tube 43 comprises a straight tube portion 42a connected to the connecting port $44a_1$ and extending in the direction of the conduit, a straight tube portion 42b connected to the connecting port $44b_1$ and extending in the direction of the conduit, bent portions 42c and 42d bent to form a loop at an end of the straight tube portions 42a and 42b, and a connecting portion having a U-shaped form and connecting the bent portions 42c and 42d. The detecting tube 43 located below the detecting tube 42 is constructed identically to the detecting tube 42 and disposed so that a straight tube portion 43a and a straight tube portion 43b are in parallel with the straight tube portions 42a and 42b. Further, the detecting tubes 42 and 43 are disposed symmetrically in an opposing manner from each other. Further, intermediate portions 42e and 43e of the detecting tubes 42 and 43 are respectively fixed on the outlet tube 46 by means of brackets 48a and 48b formed vertically on the outlet tube 46. Furthermore, the straight tube portions 42a, 42b, 43a and 43b of the detecting tubes 42 and 43 extend through a fulcrum plate 47 and welded thereto. The ends of these straight tube portions are fixedly connected to the respective connecting ports $44a_1$, $44a_2$, $44b_1$ and $44b_2$.

Thus, one of the detecting tubes, 42, extends along the conduit at a level above of the outlet tube 46 and the other of the detecting tubes, 43, extends along the conduit at a level below the outlet tube 46. Accordingly the mass flowmeter 41 of the present embodiment occupies a relatively small space even though the flowmeter is equipped with a pair of detecting tubes 42 and 43. Thus, the mass flowmeter of the present invention can be constructed to have a very compact size.

Further, the mass flowmeter 41 is less sensitive to the vibration of the conduit as the detecting tubes 42 and 43 extending along the conduit are disposed close to the outlet tube 46. Thus, the mass flowmeter 41 provides an excellent measurement of the mass flow rate. It should be noted that the outlet tube 46 extends through the fulcrum plate 47 at a hole 47a located at the center of the plate 47.

Figure 16:
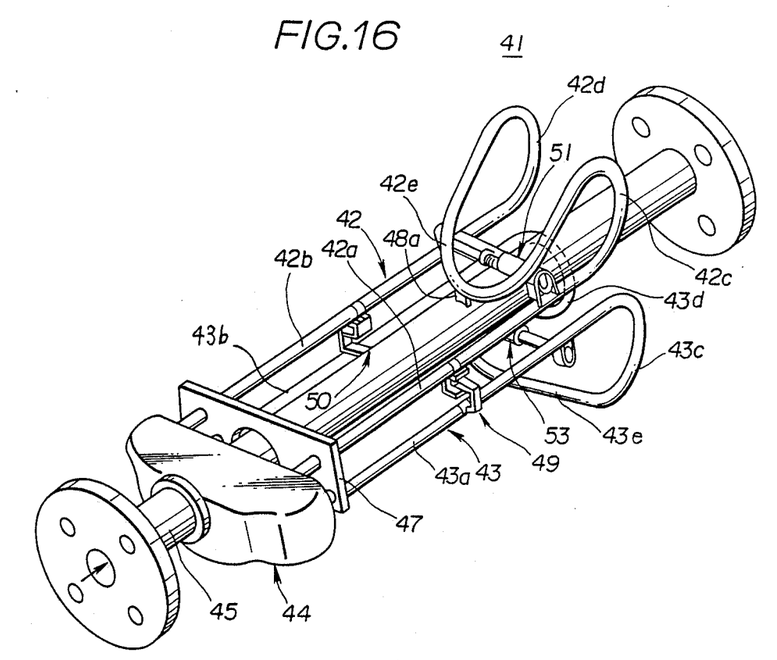
FIGS. 16, 17 and 18 are a perspective view, plan view and a side view respectively showing a fourth embodiment of the mass flowmeter of the present invention.
Figure 17:
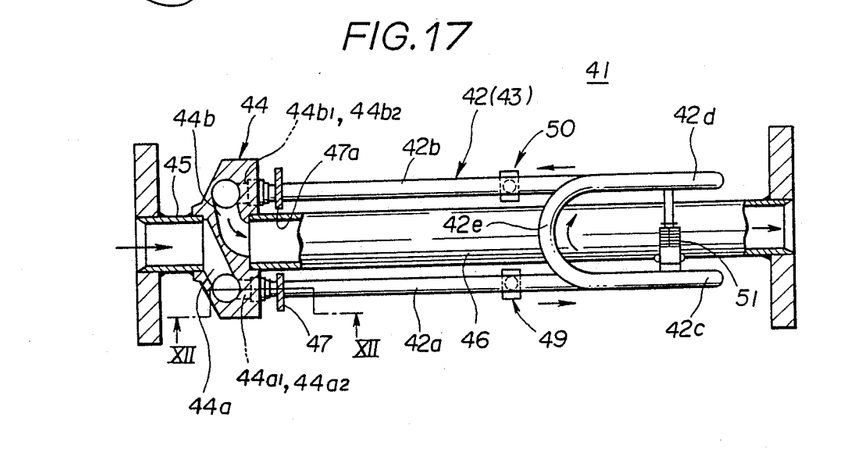
Figures 18, 19, 20:
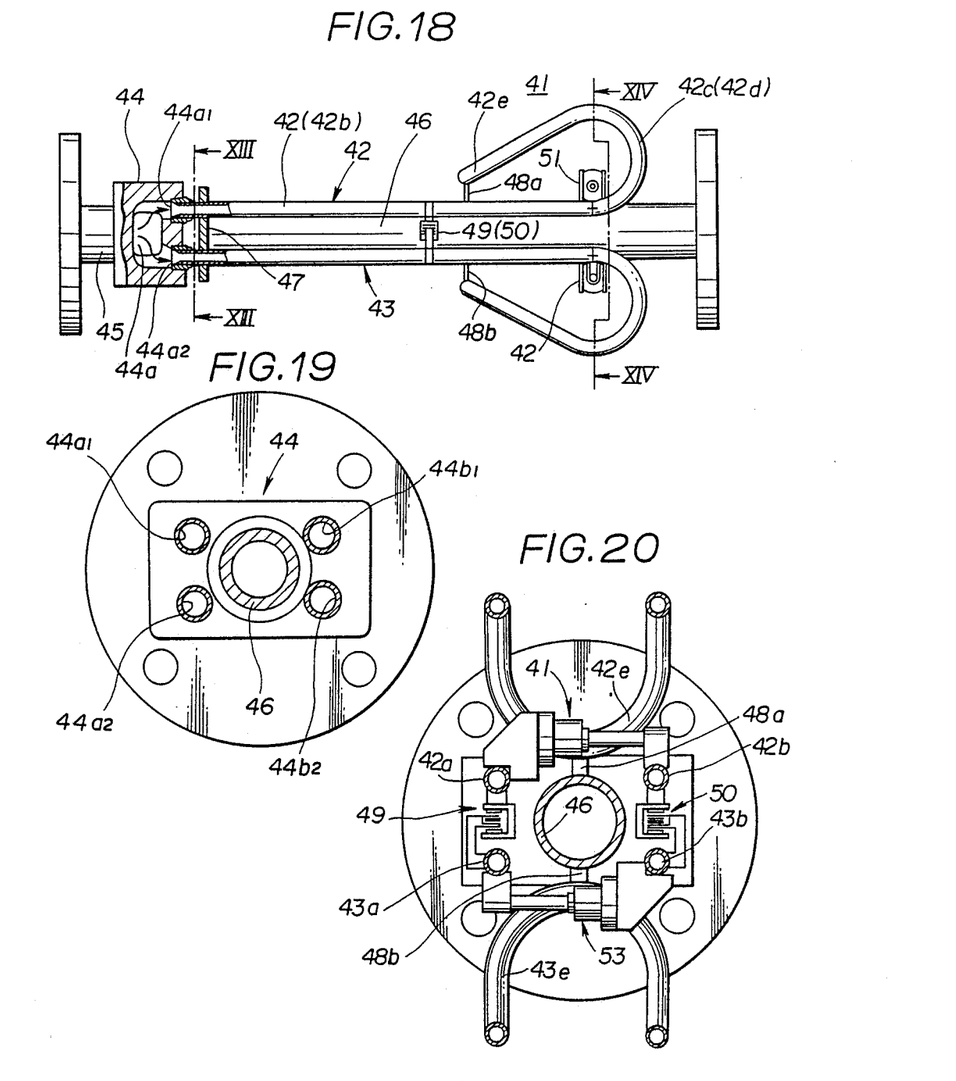
FIG. 19 is a cross sectional view taken along a line XIII—XIII of FIG. 18.
FIG. 20 is a cross sectional view taken along a line XIV—XIV of FIG. 18.

As can be seen in FIGS. 16 through 18, as well as in FIG. 20, pickup devices 49 and 50 are respectively disposed between the straight tube portion 42a and the straight tube portion 43a on the inlet side and between the straight tube portion 42b and 43b on the outlet side. These pickup devices 49 and 50 are constructed identically to the pickup devices 8 and 9 for the first embodiment. In the present embodiment, the coil portion of the pickup device is fixed to the straight tube portions 43a and 43b located at the lower level and the magnet portions facing the coil portion from the above and below are fixed to the straight tube portions 42a and 42b located at the higher level. Thus the supporting member for supporting the pickup devices can be eliminated.

Further, vibrators 51 and 53 having an identical construction to those previously described are connected between the ends of the straight tube portions 42a and 42b, and between the ends of the straight tube portions 43a and 43b.

The operation of the mass flowmeter 41 is substantially the same as those of the mass flowmeter 11 of the second embodiment. Therefore, the description of the operation of the mass flowmeter 41 will be omitted.

In the mass flowmeter described heretofore, one may use a more flexible construction for the bent portions for enhancement of the displacement of the straight tube portions responsive to the vibration applied by the vibrator. For example, the wall thickness of the connecting portion connecting the straight tube portions may be reduced as compared with the wall thickness of the straight tube portions.

In such a construction, the thin walled connecting portion is easily deformed and the vibrational characteristic of the straight tube portions can be increased. In other words, a thin walled bent portion having a smaller wall thickness as compared to the wall thickness of the straight tube portions is deformed more when an identical load is applied. Using such a thin walled tube for the bent portions, the force acting against the deformation caused by the bent portion can be reduced as compared with the case where a tube having a uniform tickness is used for the detecting tube. Thereby, one can reduce the required force applied to the detecting tube, and a small vibrator may be used for this purpose. Such a construction is also desirable also from the view point of avoiding an explosion as the electric current and voltage supplied to the vibrator can be reduced.

Further, with construction described heretofore, the detecting tube is deflected mainly responsive to the Coriolis force which is proportional to the mass flow rate. As a result, the measured mass flow rate becomes more precise and more reliable.

As an example of a construction as described above, one may use an oval shaped tube having an oval cross section and change the vibrational characteristic of the detecting tube.

Alternatively, one may increase the diameter of the connecting portion as compared with the diameter of the straight tube portion and reduce the pressure drop of the fluid.

Alternatively, the outer diameter of the connecting portion may be reduced as compared with the diameter of the straight tube portions. The detecting tube having such a construction is easily deformed responsive to the vibration applied thereto and a similar effect to the thin walled detecting tube is obtained.

Further, the connecting portion may be formed by a material different from the material forming the straight tube portions to increase the displacement.

Further, the connecting portion may be formed by a metal which is more resilient than the metal forming the straight tube portions. Alternatively, the connection portion of the detecting tube may be formed by elastic material such as a rubber or a synthetic resin.

An increase in the deformation of the detecting tube may also be achieved by using a deformable tube such as a tube having bellow profile.

Further, the present invention is not limited to these embodiments, but various variations and modifications may be made without departing from the scope of the present invention.

What is claimed is:

1. A mass flowmeter for measuring a mass flow rate of a fluid by measuring the magnitude of the Coriolis force working on the fluid comprising:
   passage means comprising a first straight tube portion for passing the fluid introduced thereto from an inlet formed at an end thereof toward a first direction, a second first straight tube portion extending in parallel to the first straight tube portion for passing the fluid toward a second direction which is opposite to the first direction to an outlet at an end thereof from which the fluid exits, and a flexible intermediate tube portion connecting the other end of the first straight tube portion and the other end of the second straight tube portion;
   fulcrum means disposed on the first and second straight tube portions relatively close to the inlet and outlet for limiting the movement of the first and second straight tube portions;
   vibrating means disposed on the first and second straight tube portions relatively close to the the other ends for applying vibration so that the first and second straight tube portions move to and from each other; and
   sensing means disposed on the first and second straight tube portions at an intermediate position between the fulcrum means and the other ends of the respective straight tube portions for detecting a relative displacement of the first and second straight tube portions moving to and from each other about the fulcrum means acting as a fulcrum.

2. A mass flowmeter as claimed in claim 1 in which said first and second straight tube portions and said intermediate tube portion are made from a material having a predetermined elastic constant, and both ends of said intermediate tube portion connected to the other ends of the first and second tube portions are bent to form a loop allowing the movement of the first and second straight tube portions to and from each other.

3. A mass flowmeter as claimed in claim 1 further comprising a reference means connected to said fulcrum means for cooperating with said sensing means as a reference for the detection of the displacement, and said vibrating means is a solenoid type vibrator having one end connected to said other end of the first straight tube portion and the other end connected to said other end of the second straight tube portion.

4. A mass flowmeter as claimed in claim 1 further comprising a branching means having an inlet tube for receiving the fluid to be measured and an outlet tube extending in parallel with said first and second straight tube portions through a space between the first and second straight tube portions, said branching means is connected with said inlet and outlet of the first and second straight tube portions for conducting the fluid to be measured supplied through the inlet tube to said inlet and conducting the fluid from said outlet to the outlet tube, said mass flowmeter further comprising reference means fixed on the outlet tube for cooperation with said sensing means, and said vibrating means is supported on the outlet tube.

5. A mass flowmeter for measuring a mass flow rate of a fluid by measuring the magnitude of the Coriolis force working on the fluid comprising:
   first passage means comprising a first straight tube portion for passing the fluid introduced thereto from a first inlet formed at an end thereof toward a first direction, a second straight tube portion extending parallel to the first straight tube portion for passing the fluid toward a second direction which is opposite to the first direction to a first outlet at an end thereof from which the fluid exits, ad a flexible intermediate tube portion connecting the other end of the first straight tube portion and the other end of the second straight tube portion;
   second passage means disposed in parallel and with same orientation to the first passage means comprising a third straight tube portion for passing the fluid introduced thereto from a third inlet formed at an end thereof toward said first direction, a fourth straight tube portion extending in parallel to the third straight tube portion for passing the fluid toward said second direction which is opposite to the first direction to a fourth outlet at an end thereof from which the fluid exits, and a second flexible intermediate tube portion connecting the other end of the third straight tube portion and the other end of the fourth straight tube portion;

fulcrum means disposed on the first, second, third and fourth straight tube portions relatively close to said inlets and outlets for limiting the movement of the first, second, third and fourth straight tube portions;

first vibrating means disposed on the first and second straight tube portions relatively close to the other ends for applying vibration so that the first and second straight tube portions move to and from each other;

second vibrating means disposed on the first and second straight tube portions relatively close to the other ends for applying vibration so that the third and fourth straight tube portions move to and from each other;

first sensing means disposed on the first and second straight tube portions at an intermediate position between the fulcrum means and the other ends of the respective first and second straight tube portions for detecting a relative displacement of the first and second straight tube portions moving to and from each other about the fulcrum means acting as a fulcrum; and second sensing means disposed on the third and fourth straight tube portions at an intermediate position between the fulcrum means and the other ends of the respective third and fourth straight tube portions for detecting a relative displacement of the third and fourth straight tube portion moving to and from each other about the fulcrum means acting as a fulcrum, said first and second vibrating means are driven such that the respective phases of the vibrations applied to the first and second passage means differ by 180 degrees so that the phase of the movement of the first and second straight tube portions to and from each other differ from the phase of the movement of the third and fourth straight tube portions to and from each other by 180 degrees.

6. A mass flowmeter as claimed in claim 5 in which said first, second, third and fourth straight tube portions and said first and second intermediate tube portions are made from a material having a predetermined elastic constant, said first and second intermediate tube portions are bent to form a loop so as to allow movement of the first and second straight tube portions and the third and fourth straight tube portions to and from each other, said first vibrating means is an electromagnetic solenoid performing a telescopic motion and has one end connected to the first straight tube portion and another end connected to the second straight tube portions, and said second vibrating means is an electromagnetic solenoid having an identical construction to the first vibrating means and having one end connected to the third straight tube portion and the other end connected to the fourth straight tube portion.

7. A mass flowmeter as claimed in claim 6 further comprising a branching means having an inlet tube for receiving the fluid to be measured and an outlet tube extending in parallel to said first, second, third and fourth straight tube portions through a space defined by the first, second, third and fourth straight tube portions, said branching means is connected to the first and second inlet ports and the first and second outlet ports for conducting the fluid entering the inlet tube to said first and second inlet ports and for conducting the fluid exhausted from the first and second outlet ports to said outlet tube.

8. A mass flowmeter as claimed in claim 6 in which said first and second vibrating means are supported on the outlet tube.

* * * * *